Aug. 12, 1969     W. H. STOKEY     3,460,409

CHIP BREAKER FOR SPADE DRILL

Filed May 10, 1967

INVENTOR.

William H. Stokey

BY

Frease & Bishop

ATTORNEYS

United States Patent Office 3,460,409
Patented Aug. 12, 1969

3,460,409
CHIP BREAKER FOR SPADE DRILL
William H. Stokey, Cleveland, Ohio, assignor to Allied Machine & Engineering Corporation, Cleveland, Ohio, a corporation of Ohio
Filed May 10, 1967, Ser. No. 637,438
Int. Cl. B23b 51/02; B26d 1/12
U.S. Cl. 77—67                                    7 Claims

ABSTRACT OF THE DISCLOSURE

A chip breaker for a spade drill having V-shaped grooves in the cutting edge of the blade, the sides of each groove being located at a 90° angle to each other, one side of each groove being parallel to the axis and the outer edges of the drill blade and the other side being perpendicular to the axis. The grooves are so spaced in staggered relation to each other that those on each side of the center will be midway between those on the other side when cutting.

BACKGROUND OF THE INVENTION

Field of the invention

The invention relates to chip breakers for spade drills for drilling metal. The purpose of a chip breaker is to make it possible to break up the metal chips so that they will be freely removed from the hole being drilled and to keep them fine enough so that they will not be long and stringy, in order to eliminate the plugging of the hole and gathering of chips around the bar.

Description of the prior art

The chip breaker generally used by the manufacturers of spade drills comprises square grooves in the cutting edge of the blade of the drill. Since the cutting edge of the blade of a spade drill is commonly located at an angle of 25° to a line perpendicular to the axis of the blade, these square grooves form sharp corners, allowing packing of the chips and rubbing on the sides, causing material galling to the tool, work-hardening of the material, if it is the type of metal that will work-harden, causing the cutting edge of the tool to fail due to this excessive hardness of the material, and also excessive wear caused by the sharp corners of the chip breaker failing.

SUMMARY OF THE INVENTION

The improved chip breaker to which the invention pertains is designed to eliminate any possibility of rubbing, and in turn eliminates galling, work-hardening, packing of chips in the chip breaker grooves, and fracturing of the tool due to excessive pressure being exerted on the point of the drill blade and allowing for maximum sharpness on the corners of the chip breaker grooves for a much longer life of the drill blade.

The improved chip breaker comprises spaced V-shaped grooves in the cutting edge of the spade drill, the sides of each groove being located at 90° to each other, one side of each groove being parallel with the axis and outer edges of the drill blade, the other side of each groove being perpendicular to the axis and side edges of the blade.

It is an object of the invention to provide a chip breaker for spade drills which will overcome the difficulties, objections and inadequacies of previous chip breakers on spade drill blades.

Another object of the invention is to provide a spade drill blade having V-shaped grooves in its cutting edge, the sides of each groove being located at a 90° angle to each other, one side of each groove being parallel to the axis and the side edges of the drill blade, and the other side being perpendicular thereto.

A further object is to provide such a chip breaker having no sharp corners.

It is also an object of the invention to provide a chip breaker of this character in which the side of each groove, which is parallel to the outer edges and axis of the blade, cannot cut or rub because the lip is radially relieved.

A still further object of the invention is to provide a chip breaker of the character referred to in which the side of each groove which is perpendicular to the axis and outer edges of the blade can and will cut when and where necessary because it is frontally cleared.

Another object of the invention is to provide a chip breaker of this type in which the grooves on each side of the center are so spaced in staggered relation to each other that those on either side of the center are midway of those on the other side when cutting, so as to make the chips smaller.

The above objects together with others which will be apparent from the drawing and following description, or which may be later referred to, may be attained by constructing the improved chip breaker in the manner hereinafter described in detail and illustrated in the accompanying drawing.

DESCRIPTION OF THE PREFERRED EMBODIMENT

Referring now more particularly to the embodiment of the invention illustrated, a spade drill blade is indicated generally at 1 having the conventional keyhole slot 2 therein for attachment to the usual bar or shaft by which it is rotated in usual and well known manner. The side edges 3 of the blade are parallel with the axis 4 thereof.

Figure 1:
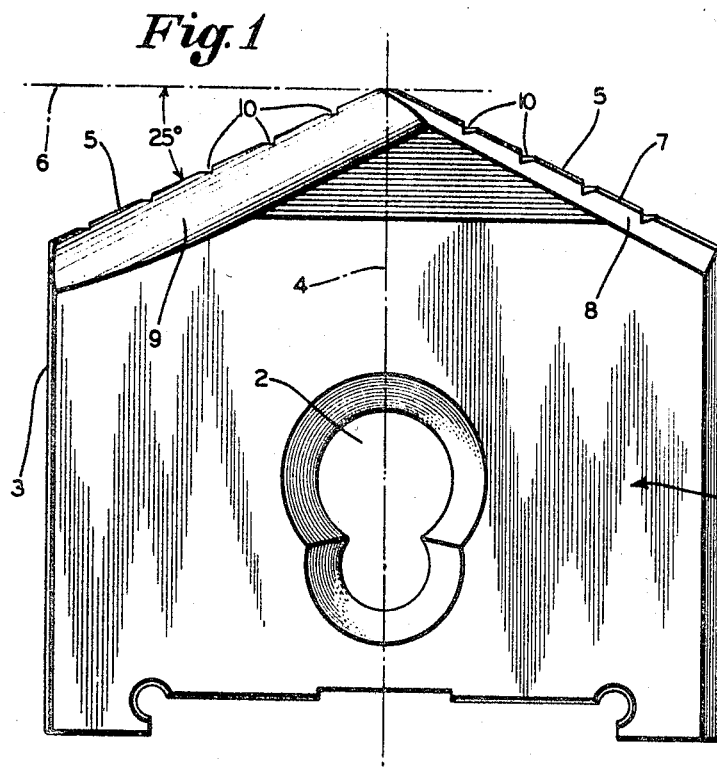
FIG. 1 is a side elevation of a spade drill blade provided with the improved chip breaker.
Figure 2:
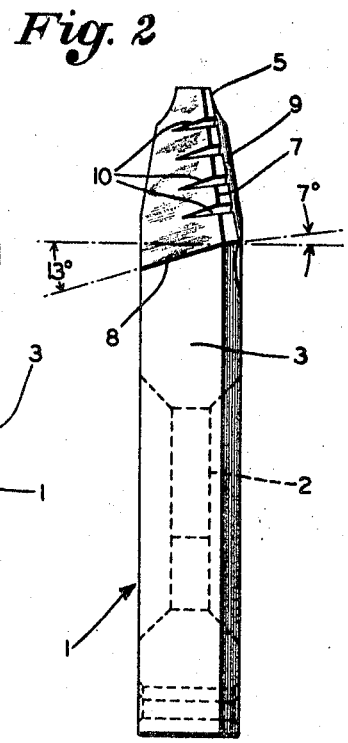
FIG. 2 is an elevation of one edge of the blade shown in FIG. 1.

As in usual practice in the construction of spade drill blades, the cutting edge is of an obtuse V-shape and, as best shown in FIG. 1, on each side of the axial center 4 the cutting edge 5 is located at an angle of 25° to a line perpendicular with the axis, as indicated at 6.

Figure 3:
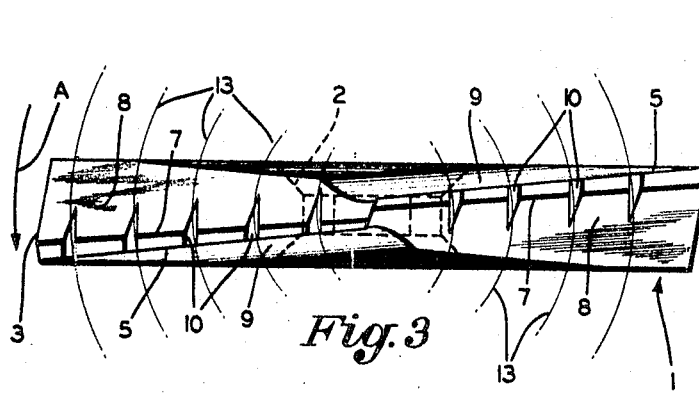
FIG. 3 is an elevation of the upper end of the blade.
Figure 4:
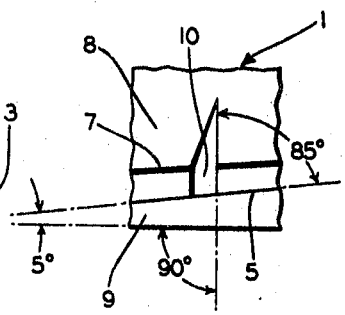
FIG. 4 is an enlarged fragmentary elevation showing one chip breaker groove in the top edge of the blade.

The top surface of the blade, on each side of center, is inclined backward and downward from the cutting edge 5 at an angle of 7° to the horizontal, to the corners 7, as indicated in FIG. 3, and then backward and downward at an angle of 13°, as indicated at 8, and forwardly it is radially relieved by the 5° angle of the lip, as indicated at 9 in FIG. 4.

Figure 5:
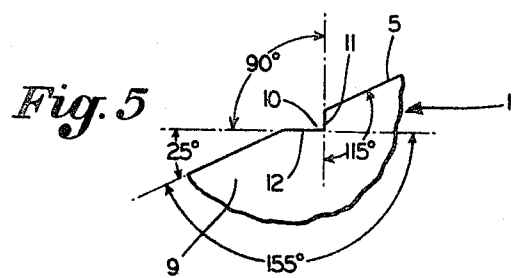
FIG. 5 is an enlarged fragmentary side elevation of the cutting edge of the blade showing one chip breaker groove in detail.

The chip breaker comprises a plurality of spaced V-shaped grooves 10 in the cutting edge 5 of the blade on each side of the center thereof. As best shown in FIG. 5, each groove 10 is of V-shape, the sides thereof being at 90° angle to each other. One side 11 of each groove is in a plane parallel with the side edges 3 and axis 4 of the blade, and the other side 12 thereof is in a plane perpendicular to the axis 4 and side edges 3.

As best shown in FIGS. 1 and 3, the grooves 10 on each side of the center are so spaced in staggered relation to each other that those on each side of the center are in the middle of those on the other side when cutting. This is done in order to make chips smaller, as it narrows up the width of the chip and does not require the normal pressure to break it up. It is impossible for chips to pack when using this new and improved chip breaker.

OPERATION

In the operation of the device, the drill blade 1 is rotated in conventional manner in the direction of the arrow A in FIG. 3. The inclined cutting edges 5 will cut into the metal, cutting chips therefrom, the chips being of a width no longer than the distance between the grooves 10, because of the relative staggered spacing of the grooves on each side of center, as best shown in FIG. 1.

The side 11 of each groove, which is parallel to the outer edges 3 and axis 4 of the blade, cannot cut or rub because the lip is radially relieved as indicated in FIGS. 3 and 4. The arcuate lines 13 in FIG. 3 show the path of the material after it passes the lip of the drill.

The 85° angle in FIG. 4 means it is radially relieved at a 5° angle because of the 5° lip angle. The side 12 of each groove, which is perpendicular to the side edges 3 and axis 4 of the blade can and will cut when and where necessary, because it is frontally cleared.

With this construction of chip breaker any possibility of rubbing is eliminated as well as galling, work-hardening, packing of chips in the chip breaker and fracturing of the tool due to excessive pressure created by these problems, while still allowing maximum strength on the corners of the chip breaker. This is due to the angles of 115° of the side 11 and 155° of the side 12 of each groove as related to the 25° lip or cutting edge angle on the standard spade drill blade.

If this angle is changed, as is sometimes done in large size spade blades, the angle of the sides 11 and 12 of the grooves to the cutting edges must be changed proportionately so that the side 11 always remains parallel to the side edges 3 and axis 4 of the blade, while the side 12 always remains perpendicular thereto.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A chip breaker for a spade drill blade having a cutting edge inclined downwardly and outwardly from the center toward both side edges forming an obtuse angle, having widely spaced grooves in the cutting edge, said grooves being relatively narrow as compared with the spaces therebetween, wherein the improvement comprises V-shaped grooves in said cutting edge, the sides of each groove being located at an angle of 90° to each other, one side of each groove being located in a plane parallel with the axis and side edges of the blade, the other side of each groove being located in a plane perpendicular to the axis and side edges of the blade.

2. A chip breaker as defined in claim 1, in which the cutting end of the blade is inclined rearwardly and downwardly from the cutting edge at a slight angle for a short distance and then at a greater angle to the other side of the blade, on each side of the center.

3. A chip breaker as defined in claim 2 in which said slight angle is approximately 7° and said greater angle is approximately 13°.

4. A chip breaker as defined in claim 1, in which the grooves on each side of the center are staggered in spaced relation to the grooves on the other side of the center.

5. A chip breaker as defined in claim 1, in which the cutting edge is inclined forwardly and outwardly from the center at an angle of approximately 5° to the adjacent surface of the blade to provide radial clearance for the grooves.

6. A chip breaker as defined in claim 5, in which the cutting end of the blade is inclined rearwardly and downwardly from the cutting edge at a slight angle for a short distance and then at a greater angle to the other side of the blade, on each side of the center.

7. A chip breaker for a spade drill blade having a cutting edge inclined downwardly and outwardly from the center toward both side edges at an angle of 25° to a line perpendicular to the axis of the blade, having spaced grooves in the cutting edge, wherein the improvement comprises V-shaped grooves in said cutting edge, the sides of each groove being located at an angle of 90° to each other, one side of each groove being located in a plane parallel with the axis and side edges of the blade and at an angle of 115° to the cutting edge, the other side of each groove being located in a plane perpendicular to the axis and side edges of the blade and at an angle of 155° to the cutting edge.

References Cited

UNITED STATES PATENTS 3,049,033   8/1962   Benjamin et al. _____ 77—68

FOREIGN PATENTS 767,138   11/1951   Germany.
123,605   3/1919   Great Britain.
452,750   8/1936   Great Britain.

FRANCIS S. HUSAR, Primary Examiner

U.S. Cl. X.R.

29—103